United States Patent
Kaigawa

(10) Patent No.: US 8,531,746 B2
(45) Date of Patent: Sep. 10, 2013

(54) IMAGE PROCESSING APPARATUS

(75) Inventor: Shinsuke Kaigawa, Kitanagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 286 days.

(21) Appl. No.: 13/183,170

(22) Filed: Jul. 14, 2011

(65) Prior Publication Data
US 2012/0013959 A1    Jan. 19, 2012

(30) Foreign Application Priority Data

Jul. 15, 2010 (JP) .................... 2010-160410

(51) Int. Cl.
*G03F 3/08* (2006.01)
*G06K 15/00* (2006.01)
*H04N 1/40* (2006.01)

(52) U.S. Cl.
USPC ............................... 358/523; 358/3.23

(58) Field of Classification Search
None
See application file for complete search history.

(56) References Cited

U.S. PATENT DOCUMENTS 6,151,135 A * 11/2000 Tanaka et al. ............ 358/1.9
7,483,172 B2 * 1/2009 Hung ....................... 358/1.9

FOREIGN PATENT DOCUMENTS

| JP | H11-289467 A | 10/1999 |
| JP | 2008-010946 A | 1/2008 |
| JP | 2008-091989 A | 4/2008 |

* cited by examiner

Primary Examiner — Douglas Tran
(74) Attorney, Agent, or Firm — Baker Botts L.L.P.

(57) ABSTRACT

An image processing apparatus is provided. The image processing apparatus includes: an acquiring unit that acquires original image data and a first color conversion profile associated with the original image data; an editing unit that edits the original image data by using the first color conversion profile to generate edited image data; a preparing unit that prepares a second color conversion profile different from the first color conversion profile in a first case where the editing unit generates the edited image data having a data size smaller than that of the original image data, wherein a data size of the second color conversion profile is smaller than that of the first color conversion profile; and a storage control unit that, in the first case, stores the edited image data and the second color conversion profile in a memory while being associated with each other.

11 Claims, 3 Drawing Sheets

FIG. 2A
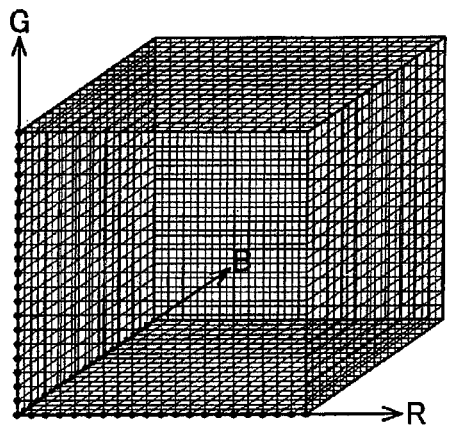
HIGH-QUALITY ICC PROFILE 62 ($21^3$ GRIDS)
FIG. 2B
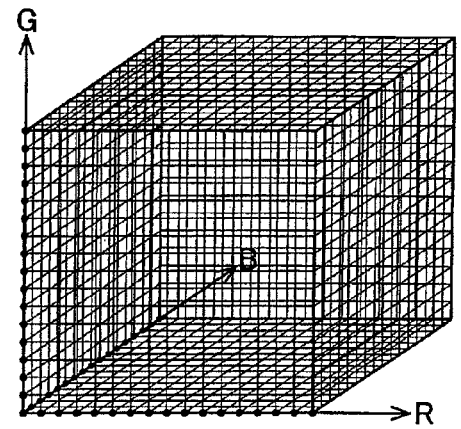
LOW-QUALITY ICC PROFILE 64 ($17^3$ GRIDS)
FIG. 2C
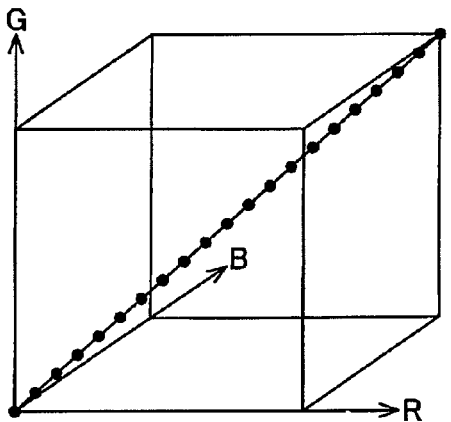
MONOCHROME ICC PROFILE 66 (21 GRIDS)
FIG. 2D
$$Gray' = (Gray/255)^{\gamma_{gray}}$$
$$\begin{bmatrix} X \\ Y \\ Z \end{bmatrix} = \begin{bmatrix} a1 \\ a2 \\ a3 \end{bmatrix} [Gray']$$
MONOCHROME ICC PROFILE 68

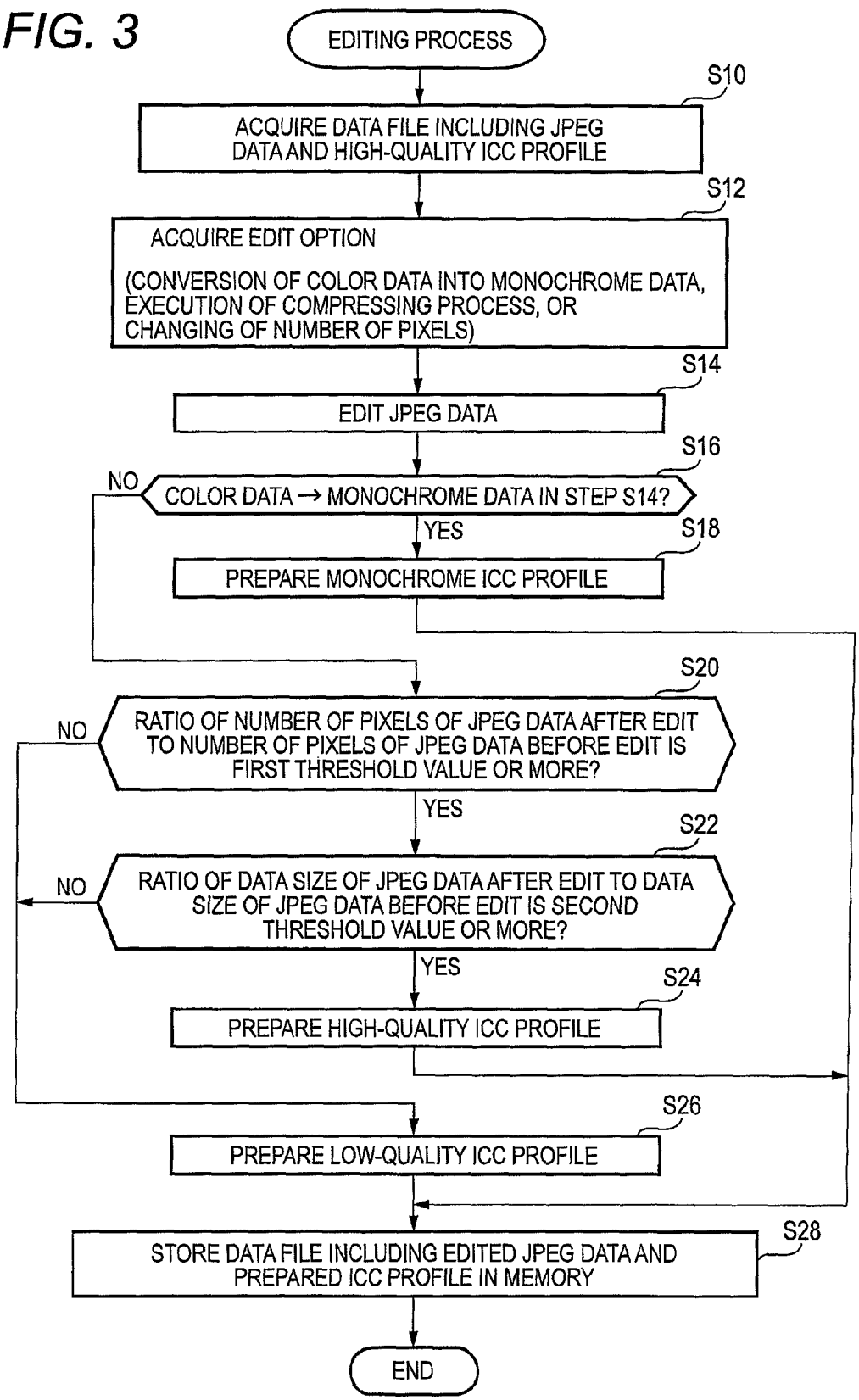

IMAGE PROCESSING APPARATUS

CROSS-REFERENCE TO RELATED APPLICATION

This application claims priority from Japanese Patent Application No. 2010-160410, filed on Jul. 15, 2010, the entire subject matter of which is incorporated herein by reference.

TECHNICAL FIELD

Aspects of the present invention relates to an image processing apparatus that edits image data to generate edited image data.

Generally, if an image file includes image data and a color conversion profile, an image processing apparatus uses the color conversion profile to reproduce an image represented by the image data. Further, when editing the image data in the image file, the image processing apparatus uses the color conversion profile to edit the image data, thereby generating edited image data. Then, the image processing apparatus generates an image file including the edited image data and the color conversion profile used in the editing.

Conventionally, the relationship between the edited image data and the color conversion profile has not been considered so much.

SUMMARY

Accordingly, it is an aspect of the present invention to provide a technique capable of associating an appropriate color conversion profile to edited image data when image data is edited.

According to an illustrative embodiment of the present invention, there is provided an image processing apparatus includes an acquiring unit, an editing unit, a preparing unit and a storage control unit. The acquiring unit acquires original image data and a first color conversion profile associated with the original image data. The editing unit edits the original image data by using the first color conversion profile to generate edited image data. The preparing unit prepares a second color conversion profile different from the first color conversion profile in a first case where the editing unit generates the edited image data having a data size smaller than that of the original image data, wherein a data size of the second color conversion profile is smaller than that of the first color conversion profile. The storage control unit stores the edited image data and the second color conversion profile in a memory while being associated with each other, in the first case.

A control method, a computer program, and a non-transitory computer-readable storage medium for storing the computer program for implementing the functions of the image processing apparatus are also new and useful.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIGS. 2A to 2D schematically show ICC profiles;
and
FIG. 3 shows a flow chart of an editing process.

DETAILED DESCRIPTION

First Illustrative Embodiment (Configuration of System)

Figure 1:
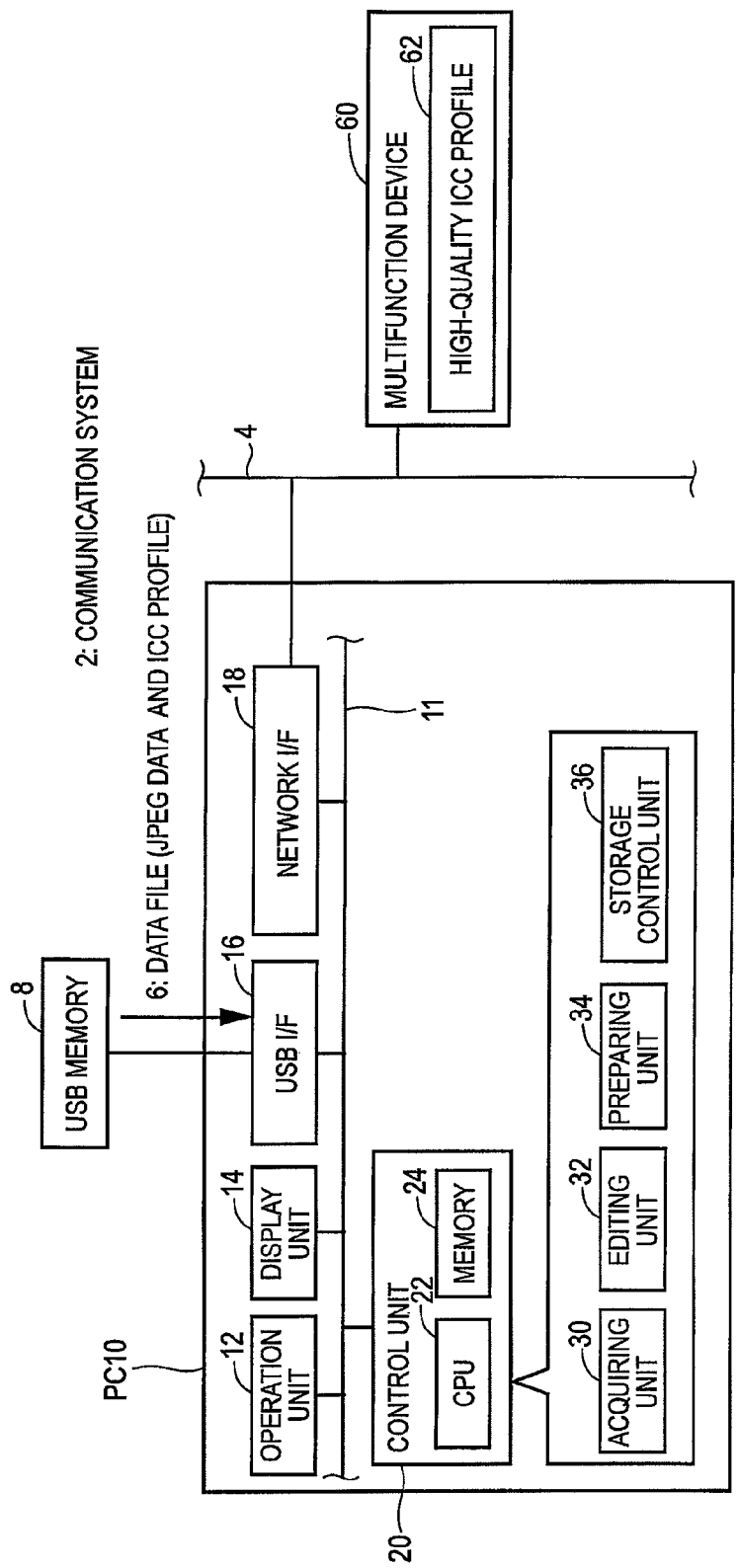
FIG. 1 shows a configuration of a communication system.

A first illustrative embodiment will be described with reference to the accompanying drawings. As shown in FIG. 1, a communication system 2 includes a personal computer (PC) 10, and multifunction device 60 which is a peripheral device of the PC 10. The PC 10 and the multifunction device 60 are capable of communicating with each other through a network cable 4.

(Configuration of PC 10)

A configuration of the PC 10 will be described. The PC 10 includes an operation unit 12, a display unit 14, a USB interface 16, a network interface 18, and a control unit 20. Each of the units 12 to 20 is connected to a bus line 11. The operation unit 12 includes a key board and a mouse. A user can input various instructions to the PC 10 by operating the operation unit 12. The display unit 14 is configured to display various kinds of information. In the USB interface 16, an USB memory 8 which is an external memory portable by the user is installed. The network interface 18 is connected with the network cable 4.

The control unit 20 includes a CPU 22 and a memory 24. The CPU 22 performs various processes according to a program (not shown) stored in the memory 24. The CPU 22 performs a process according to the program, thereby realizing the functions of an acquiring unit 30, an editing unit 32, a preparing unit 34, and a storage control unit 36.

(Configuration of Multifunction Device 60)

The multifunction device 60 is configured to perform a plurality of functions including a printing function and a scanning function. The multifunction device 60 stores the high-quality ICC profile 62. The high-quality ICC profile 62 is stored in the multifunction device 60 in advance by a vendor of the multifunction device 60. The high-quality ICC profile 62 is so-called input-side ICC profile. The high-quality ICC profile 62 is a profile for converting image data which is represented by device-dependent colors depending on the characteristics (particularly, color characteristics) of the multifunction device 60, into intermediate image data which is represented by device-independent colors independent from the characteristics of the device. Specifically, the high-quality ICC profile 62 is an ICC profile in which a plurality of sets of coordinate values in an RGB color space are associated with a plurality of sets of coordinate values in an XYZ color space. Hereinafter, image data in which a value of each pixel is represented by coordinate values in the RGB color space is referred to as RGB image data, and image data in which a value of each pixel is represented by coordinate values in the XYZ color space is referred to as XYZ image data.

For example, if an ICC profile in which $256^3$ sets of coordinate values in the RGB color space are respectively associated with $256^3$ sets of coordinate values in the XYZ color space is used, it is possible to accurately convert RGB image data with a 256 tone level to XYZ image data. However, such an ICC profile has a massive data size. In the first illustrative embodiment, in order to reduce the data size of the ICC profile, a profile in which $21^3$ sets of coordinate values in the RGB color space (hereinafter, referred to as $21^3$ sets of RGB coordinate values) are associated with $21^3$ sets of coordinate values in the XYZ color space (hereinafter, referred to as $21^3$ sets of XYZ coordinate values) is used as the high-quality ICC profile 62. FIG. 2A schematically shows the $21^3$ sets of RGB coordinate values (that is, $21^3$ lattice points (grids)) included in the high-quality ICC profile 62. The XYZ coordinate values are respectively assigned to each lattice point.

For example, if a value of a first pixel included in the RGB image data is represented by first RGB coordinate values (R1, G1, B1), and the $21^3$ sets of RGB coordinate values of the high-quality ICC profile 62 includes the exact first RGB coordinate values (R1, G1, B1), a certain device (for example, the PC 10) using the RGB image data can convert the first RGB coordinate values (R1, G1, B1) into first XYZ coordinate values (X1 Y1, Z1). Also, for example, even if a value of a second pixel included in the RGB image data is represented by second RGB coordinate values (R2, G2, B2), and the $21^3$ sets of RGB coordinate values of the high-quality ICC profile 62 does not includes the exact second RGB coordinate values (R2, G2, B2), the certain device can convert the second RGB coordinate values (R2, G2, B2) into second XYZ coordinate values (X2, Y2, Z2) by using the high-quality ICC profile 62. For example, the certain device performs an interpolation process on the basis of the relationship between one or more sets of RGB coordinate values (Rn, Gn, Bn) (for example, one or more sets of RGB coordinate values in the vicinity of the second RGB coordinate values (R2, G2, B2)) of the $21^3$ sets of RGB coordinate values and one or more sets of XYZ coordinate values (Xn, Yn, Zn) associated with the one or more sets of RGB coordinate values (Rn, Gn, Bn), thereby converting the second RGB coordinate values (R2, G2, B2) into the second XYZ coordinate values (X2, Y2, Z2).

FIGS. 2B and 2C respectively show a low-quality ICC profile 64 and a monochrome ICC profile 66 to be described below. In the multifunction device 60, only the high-quality ICC profile 62 is stored, and the low-quality ICC profile 64 and the monochrome ICC profile 66 are not stored. And, a monochrome ICC profile 68 shown in FIG. 2D will be described below.

In a state where the USB memory 8 is installed in the multifunction device 60, if the user inputs an instruction to perform a scan, the multifunction device 60 scans an original (a scan subject) and generates JPEG data. The JPEG data includes various kinds of information such as a JPEG header, a JPEG footer, and the like, and JPEG image data representing the scanned original. The JPEG image data is obtained by scanning the original to obtain RGB bitmap data (hereinafter, referred to as BMP-formatted RGB image data) and compressing the BMP-formatted RGB image data. The multifunction device 60 writes a data file 6 (see FIG. 1) including the JPEG data and the high-quality ICC profile 62 in the USB memory 8.

(Processes Performed by PC 10)

The user can carry the USB memory 8 including the data file 6. The user can install the USB memory 8 in the USB interface 16 of the PC 10, and operates the operation unit 12 for reading the data file 6 in the USB memory 8 to the PC 10. In this case, as shown in step S10 of FIG. 3, the acquiring unit 30 (see FIG. 1) acquires the data file 6 from the USB memory 8.

Since the JPEG data and the high-quality ICC profile 62 are included in the same data file 6 as described above, the process of step S10 means a process of acquiring the JPEG data and the high-quality ICC profile 62 associated with the JPEG data. It is noted that the associating manner can be in various forms. In a first modified example, the associating may be performed by including a file of the JPEG data and the high-quality ICC profile 62 different from the file of the JPEG data in one folder. In a second modified example, the associating may be performed by including information on the high-quality ICC profile 62 (for example, a file name of the high-quality ICC profile 62) in the JPEG data. In a third modified example, the associating may be performed by generating information for linking the file of the JPEG data with the high-quality ICC profile 62 different from the file of the JPEG data.

Hereinafter, the JPEG data included in the data file 6 acquired in step S10 is referred to as acquired JPEG data. Further, in step S10, the editing unit 32 (see FIG. 1) decompresses the JPEG image data included in the acquired JPEG data in the data file 6 to generate the BMP-formatted RGB image data. Next, the editing unit 32 uses the high-quality ICC profile 62 in the data file 6 to convert the (BMP-formatted) RGB image data into (BMP-formatted) XYZ image data. Specifically, the editing unit 32 converts each pixel represented by RGB coordinate values included in the BMP-formatted RGB image data into each pixel represented by XYZ coordinate values by using $21^3$ sets of RGB coordinate values and $21^3$ sets of XYZ coordinate values included in the high-quality ICC profile 62.

In step S10, the editing unit 32 also converts the BMP-formatted XYZ image data into output image data represented by device-dependent colors depending on the characteristics of the PC 10 (particularly, the color characteristics of the display unit 14). For this conversion, an output-side color conversion profile (output-side ICC profile) is stored in the memory 24 of the PC 10 in advance. The output-side color conversion profile may be a color conversion profile in which a plurality of sets of coordinate values in the XYZ color space are associated with a plurality of sets of coordinate values in a color space (for example, the RGB color space) corresponding to the display unit 14. The editing unit 32 provides the output image data to the display unit 14. Therefore, an output image represented by the output image data is displayed on the display unit 14. The user can see the output image.

While viewing the output image, the user can input an edit option by operating the operation unit 12. For example, if the JPEG image data represents a color image (that is, the output image is a color image), the user can operate the operation unit 12 to convert the JPEG image data representing the color image into JPEG image data representing a monochrome image. Hereinafter, this conversion is referred to as monochrome conversion. Also, the user can operate the operation unit 12 to perform a compressing process on the JPEG image data. Further, the user can operate the operation unit 12 to change the number of pixels of the JPEG image data. Furthermore, the user can perform operation to increase the number of pixels (that is, to enlarge the JPEG image data) or to reduce the number of pixels (that is, to size-reduce the JPEG image data). In step S12, the editing unit 32 acquires the edit option (execution of the monochrome conversion, execution of a compressing process, or changing of the number of pixels) input by the user.

Next, in step S14, the editing unit 32 edits the acquired JPEG data according to the edit option acquired in step S12. The contents of various kinds of edits performed in step S14 will be descried below.

(Edit of Monochrome Conversion)

For example, if the edit option represents the monochrome conversion, the editing unit 32 converts the JPEG image data representing the color image included in the acquired JPEG data into the JPEG image data representing the monochrome image. Specifically, the editing unit 32 changes the RGB values of each of the plurality of pixels constituting the JPEG image data before the monochrome conversion (the JPEG image data representing the color image) such that the RGB values of the corresponding pixel become the same value. As a result, the JPEG image data after the monochrome conversion (the JPEG image data representing the monochrome image) is acquired. Next, the editing unit 32 generates edited JPEG data including the JPEG image data after the monochrome conversion. Actually, the JPEG image data before the monochrome conversion is decompressed, is subjected to the monochrome conversion, and then is compressed. In the first illustrative embodiment, each pixel in the JPEG image data after the monochrome conversion is configured by three, RGB values. Further, the number of pixels of the JPEG image data after the monochrome conversion is equal to the number of pixels of the JPEG image data before the monochrome conversion.

(Edit of Compressing Process)

For example, if the edit option acquired in step S12 represents execution of a compressing process, the editing unit 32 decompresses the JPEG image data included in the acquired JPEG data to generate the BMP-formatted RGB image data. Next, the editing unit 32 compresses the BMP-formatted RGB image data by using a target compression rate (target compression degree) acquired in step S12, thereby generating compressed JPEG image data. Specifically, the editing unit 32 selects a quantization table according to the target compression rate, and uses the selected quantization table to generate the compressed JPEG image data. Next, the editing unit 32 generates edited JPEG data including the compressed JPEG image data. As the compression degree increases, the data size of the edited JPEG data decreases.

(Edit of Changing of Number of Pixels)

For example, if the edit option acquired in step S12 represents changing of the number of pixels, the editing unit 32 changes (more specifically, increases or decreases) the number of pixels of the JPEG image data included in the acquired JPEG data, so as to generate JPEG image data having the same number of pixels as the target number of pixels represented by the edit option acquired in step S12 after the changing of the number of pixels. Actually, the JPEG image data before the changing of the number of pixels is decompressed, is subject to the changing of the number of pixels, and then is compressed. Next, the editing unit 32 generates edited JPEG data including the JPEG image data after the changing of the number of pixels. If an edit is performed to decrease the number of pixels, the data size of the edited JPEG data is smaller than the data size of the acquired JPEG data. In contrast, if an edit is performed to increase the number of pixels, the data size of the edited JPEG data is larger than the data size of the acquired JPEG data.

(ICC-Profile Preparing Process)

Then, in step S16, the preparing unit 34 (see FIG. 1) determines whether the edit performed in step S14 is the monochrome conversion or not. In a case of Yes, in step S18, the preparing unit 34 prepares the monochrome ICC profile 66 (see FIG. 2C). As described above, the RGB values of each pixel of the JPEG image data representing the monochrome image are the same value. Therefore, if using an ICC profile including RGB coordinate values in which the RGB values are the same value, it is possible to appropriately convert the JPEG image data representing the monochrome image into XYZ image data. As described above, in the high-quality ICC profile 62, the $21^3$ sets of RGB coordinate values are associated with the $21^3$ sets of XYZ coordinate values. The preparing unit 34 specifies 21 sets of RGB coordinate values where the RGB values are the same value, from the $21^3$ sets of RGB coordinate values included in the high-quality ICC profile 62. Therefore, the preparing unit 34 also specifies 21 sets of XYZ coordinate values associated with the 21 sets of RGB coordinate values. In other words, the preparing unit 34 specifies the 21 sets of RGB coordinate values and the 21 sets of XYZ coordinate values by removing out the other RGB coordinate values and the other XYZ coordinate values from the high-quality ICC profile 62. The preparing unit 34 generates the monochrome ICC profile 66 in which the 21 sets of RGB coordinate values are associated with the 21 sets of XYZ coordinate values, thereby preparing the monochrome ICC profile 66.

FIG. 2C schematically shows 21 sets of RGB coordinate values (that is, 21 lattice points (grids)) included in the monochrome ICC profile 66. The number of sets of RGB coordinate values and XYZ coordinate values (each of which is 21) included in the monochrome ICC profile 66 is considerably less than the number of sets of RGB coordinate values and XYZ coordinate values (each of which is $21^3$) included in the high-quality ICC profile 62. Therefore, the data size of the monochrome ICC profile 66 is considerably smaller than the data size of the high-quality ICC profile 62.

In a case of No in step S16 (a case where the edit performed in step S14 is not the monochrome conversion), in step S20, the preparing unit 34 specifies a first number of pixels which is the number of pixels of the JPEG image data included in the acquired JPEG data, and a second number of pixels which is the number of pixels of the JPEG image data included in the edited JPEG data. In step S20, further, the editing unit 32 determines whether a ratio of the second number of pixels to the first number of pixels (that is, (Second Number of Pixels)/(First Number of Pixels)) is a predetermined first threshold value or more. The first threshold value is a value (for example, 0.5) which is 1 or less. For example, if an edit for decreasing the number of pixels has been performed in step S14, since the ratio of the second number of pixels to the first number of pixels can be smaller than the first threshold value, in step S20, the determination result can be No. In the case of No in step S20, the editing process proceeds to step S26. Meanwhile, for example, in a case where an edit for increasing the number of pixels has been performed in step S14, since the ratio of the second number of pixels to the first number of pixels is not smaller than the first threshold value, in step S20, the determination result is Yes. In the case of Yes in step S20, the editing process proceeds to step S22.

In step S22, the preparing unit 34 specifies a first data size which is the data size of the acquired JPEG data, and a second data size which is the data size of the edited JPEG data. In step S20, the editing unit 32 further determines whether a ratio of the second data size to the first data size (that is, (Second Data Size)/(First Data Size)) is a predetermined second threshold value or more. The second threshold value is a value (for example, 0.5) which is 1 or less. For example, if the compressing process has been performed in step S14, since the ratio of the second data size to the first data size can be smaller than the second threshold value, in step S22, the determination result can be No. In the case of No in step S22, the editing process proceeds to step S26. Meanwhile, for example, if the compressing process has not been performed in step S14, since the ratio of the second data size to the first data size is not smaller than the second threshold value, in step S22, the determination result is Yes. In the case of Yes in step S22, the editing process proceeds to step S24.

In step S24, the preparing unit 34 prepares the high-quality ICC profile 62 (see FIG. 2A) in the data file 6 acquired in step S10. After step S24, the editing process proceeds to step S28.

In the meantime, in step S26, the preparing unit 34 prepares the low-quality ICC profile 64 (see FIG. 2B). Specifically, the preparing unit 34 specifies $17^3$ sets of RGB coordinate values, from the $21^3$ sets of RGB coordinate values included in the high-quality ICC profile 62 in the data file 6 acquired in step S10, and further specifies $17^3$ sets of XYZ coordinate values associated with the $17^3$ sets of RGB coordinate values, from the $21^3$ sets of XYZ coordinate values. In other words, the preparing unit 34 specifies the $17^3$ sets of RGB coordinate values and the $17^3$ sets of XYZ coordinate values by removing out the other RGB coordinate values and XYZ coordinate values from the high-quality ICC profile 62. In a modified example, the preparing unit 34 may specify the $17^3$ sets of RGB coordinate values and the $17^3$ sets of XYZ coordinate values by performing interpolation on the basis of the relationship between the RGB coordinate values and the XYZ coordinate values in the high-quality ICC profile 62. That is, the $17^3$ sets of RGB coordinate values and the $17^3$ sets of XYZ coordinate values may include RGB coordinate values and XYZ coordinate values which are not included in the $21^3$ sets of RGB coordinate values and the $21^3$ sets of XYZ coordinate values, respectively. In both of the first illustrative embodiment and the above-described example, the preparing unit 34 specifies the $17^3$ sets of RGB coordinate values such that distances between two adjacent sets of RGB coordinate values are equal as possible. The preparing unit 34 generates the low-quality ICC profile 64 in which the $17^3$ sets of RGB coordinate values are associated with the $17^3$ sets of XYZ coordinate values, thereby preparing the low-quality ICC profile 62. After step S26, the editing process proceeds to step S28.

FIG. 2C schematically shows the $17^3$ sets of RGB coordinate values (that is, $17^3$ lattice points (grids)) included in the low-quality ICC profile 64. The number of sets of RGB coordinate values and XYZ coordinate values (each of which is $17^3$) included in the low-quality ICC profile 64 is less than the number of sets of RGB coordinate values and XYZ coordinate values (each of which is $21^3$) included in the high-quality ICC profile 62. Therefore, the data size of the low-quality ICC profile 64 is smaller than the data size of the high-quality ICC profile 62. Further, the number of sets of RGB coordinate values and XYZ coordinate values (each of which is $17^3$) included in the low-quality ICC profile 64 is greater than the number of sets of RGB coordinate values and XYZ coordinate values (each of which is 21) included in the monochrome ICC profile 66. Therefore, the data size of the low-quality ICC profile 64 is larger than the data size of the monochrome ICC profile 66.

As described above, in the first illustrative embodiment, the preparing unit 34 generates each of the individual ICC profiles 64 and 66 from the high-quality ICC profile 62, to prepare each of the individual ICC profiles 64 and 66. Since it is unnecessary to store the ICC profiles 64 and 66 in the memory 24 in advance, it is possible to reduce an amount of data in the memory 24. In a modified example, the control unit 20 may acquire the ICC profiles 64 and 66 from an external device (for example, a server provided by the vendor of the multifunction device 60) in advance, and store the ICC profiles 64 and 66 in the memory 24 in advance. In this case, the preparing unit 34 can read the ICC profiles 64 and 66 stored in the memory 24 from the memory 24 to prepare the ICC profiles 64 and 66. In this modified example, since the preparing unit 34 need not generate the ICC profiles 64 and 66, the preparing unit 34 can quickly prepare the ICC profiles 64 and 66.

In step S28, the storage control unit 36 (see FIG. 1) stores, in memory 24, one data file including the edited JPEG data generated in step S14 and the prepared ICC profile prepared in any one of steps S18, S24, and S26. That is, the storage control unit 36 associates the edited JPEG data with the prepared ICC profile and stores the edited JPEG data and the prepared ICC profile in the memory 24. As a manner of the associating of step S28, instead of storing one data file including the edited JPEG data and the prepared ICC profile in the memory 24, the same associating manners as those in the above-described first, second, or third modified example may be used. After step S28, the editing process ends.

(Use of Edited JPEG Data)

The user can operate the operation unit 12 of the PC 10 to display an edited image represented by the data file (hereinafter, referred to as the specific data file) stored in the memory 24 in step S28. In this case, the control unit 20 of the PC 10 decompresses the JPEG image data included in the edited JPEG data in the specific data file so as to generate the (BMP-formatted) RGB image data. Next, the control unit 20 converts the generated RGB image data into the XYZ image data by using the ICC profile (that is, the ICC profile prepared in any one of steps S18, S24, and S26 of FIG. 3) in the specific data file. The control unit 20 further converts the XYZ image data into the output image data by using the output-side ICC profile stored in the PC 10 in advance. The control unit 20 provides the output image data to the display unit 14. Therefore, the edited image represented by the output image data is displayed on the display unit 14. The user can view the edited image.

Also, the user can operate the operation unit 12 of the PC 10 to store the specific data file in the USB memory 8. Then, the user can carry the USB memory 8 and install the USB memory 8 in the USB interface 16 of the multifunction device 60. In this case, like the above-described process of the control unit 20 of the PC 10, a control unit (not shown) of the multifunction device 60 generates the XYZ image data from the specific data file and then converts the XYZ image data into the output image data (for example, CMYK image data) by using the output-side ICC profile stored in the multifunction device 60 in advance. The control unit of the multifunction device 60 performs printing according to the output image data. Therefore, the user can obtain a print medium having the edited image, represented by the output image data, printed thereon.

(Effects According to First Illustrative Embodiment)

The communication system 2 according to the first illustrative embodiment has been described in detail. If using the high-quality ICC profile 62, the device (for example, the PC 10 or the multifunction device 60) using the edited JPEG data can appropriately convert the JPEG image data included in the edited JPEG data into the XYZ image data. Therefore, whatever features the generated edited JPEG data has, a configuration in which the PC 10 associates the edited JPEG data with the high-quality ICC profile 62 and stores the edited JPEG data and the high-quality ICC profile 62 in the memory 24 can be conceived of However, as described above, for example, in order to convert the JPEG image data representing the monochrome image into the XYZ image data, if using an ICC profile including only RGB coordinate values where the RGB values are the same value, it is possible to appropriate perform color conversion from RGB to XYZ.

In consideration of the actual circumstances, if the edited JPEG data representing the monochrome image is generated (the case of Yes in step S16 of FIG. 3), the PC 10 according to the first illustrative embodiment prepares the monochrome ICC profile 66 having a data size smaller than the data size of the high-quality ICC profile 62 (step S18 of FIG. 3). Therefore, if the edited JPEG data representing the monochrome image is generated, it is possible to suppress an ICC profile having an excessive quality from being associated with the edited JPEG data.

Further, if the edited JPEG data including the JPEG image data having a relatively large number of pixels is generated when an image is size-reduced (the number of pixels is reduced) according to an instruction from the user, or a if the edited JPEG data including the JPEG image data compressed with a relatively low compression rate is generated according to an instruction from the user, the user is likely to desire to obtain an output image having image colors, represented by the edited JPEG data, faithfully reproduced. Meanwhile, if the edited JPEG data including the JPEG image data having a relatively small number of pixels is generated when an image is size-reduced (the number of pixels is reduced) according to an instruction from the user, or if the edited JPEG data including the JPEG image data compressed with a relatively high compression rate is generated according to an instruction from the user, a request of the user on the reproducibility of colors is not expected to be high.

In consideration of the actual circumferences, if the edited JPEG data including the JPEG image data having the relative small number of pixels (a case of No in step S20 of FIG. 3), the PC 10 according to the first illustrative embodiment prepares the low-quality ICC profile 64 having the data size smaller than the data size of the high-quality ICC profile 62 in step S26 of FIG. 3. If the edited JPEG data including the JPEG image data compressed with the relative high compression rate is generated (a case of No in step S22 of FIG. 3), the PC 10 prepares the low-quality ICC profile 64 having the data size smaller than the data size of the high-quality ICC profile 62 in step S26 of FIG. 3. Therefore, it is possible to suppress an ICC profile having an excessive quality from being associated with the edited JPEG data.

As described above, the PC 10 according to the first illustrative embodiment can associate an ICC profile having an appropriate quality (that is, an appropriate data size) with the edited JPEG data according the features of the edited JPEG data (that is, the contents of the edit). It is possible to suppress an ICC profile having an excessive quality from being associated with the edited JPEG data. As a result, if outputting the edited JPEG data and the ICC profile to the outside, it is possible to reduce the total size of the output data. If an output destination is a portable USB memory, it is possible to reduce the capacity which the USB memory should store, and if the output destination is a device connected through a network, it is possible to reduce communication traffic of the network. Further, it is possible to reduce a load of a resource (such as a load of the storage capacity of the memory, a process load of the control unit, or the like) of a device using the edited JPEG data (for example, the PC 10 or the multifunction device 60).

In the above, the JPEG data acquired in step S10 of FIG. 3 is an example of original image data, and the edited JPEG data generated in step S14 is an example of the edited image data. The high-quality ICC profile 62 is an example of a first color conversion profile, and the low-quality ICC profile 64 (or the monochrome ICC profile 66) is an example of a second color conversion profile. The RGB color space is an example of a first color space, and the XYZ color space is an example of a second color space. The $17^3$ sets of RGB coordinate values are examples of N sets of values corresponding to N sets of coordinate values in the first color space.

Second Illustrative Embodiment

Differences between a second illustrative embodiment and the first illustrative embodiment will be described. In the first illustrative embodiment, if an edit of the monochrome conversion is performed in step S14 of FIG. 3, each pixel in the JPEG image data after the monochrome conversion is composed of three, RGB values. In contrast, in the second illustrative embodiment, the editing unit 32 performs the monochrome conversion such that each pixel in the JPEG image data after the monochrome conversion is represented by one value regarding brightness, not by three, RGB values. According to this configuration, the data size of the JPEG image data (in which each pixel is represented by one value regarding the brightness) after the monochrome conversion is smaller than the data size of the JPEG image data (in which each pixel is represented by three, RGB values) before the monochrome conversion. Therefore, the data size of the edited JPEG data is smaller than the data size of the acquired JPEG data.

In the first illustrative embodiment, in step S18 of FIG. 3, the preparing unit 34 prepares the monochrome ICC profile 66 in which the 21 sets of RGB coordinate values are associated with the 21 sets of XYZ coordinate values. In contrast, in the second illustrative embodiment, in step S18 of FIG. 3, the preparing unit 34 prepares an ICC profile for monochrome in which 21 values regarding the brightness are associated with the 21 sets of XYZ coordinate values. The ICC profile for monochrome prepared in the second illustrative embodiment may be generated from the high-quality ICC profile 62 or may be stored in the memory 24 in advance. Further, the data size of the ICC profile for monochrome prepared in the second illustrative embodiment is smaller than the data size of the high-quality ICC profile 62.

Even in the second illustrative embodiment, if an edit of the monochrome conversion is performed, it is possible to associate an ICC profile having an appropriate quality (that is, an appropriate data size) with the edited JPEG data. Herein, the 21 values regarding the brightness are examples of the N sets of values corresponding to the N sets of coordinate values in the first color space. That is, in general, the N sets of values corresponding to the N sets of coordinate values in the first color space may be coordinate values themselves in the first color space as in the first illustrative embodiment, or may be values obtained from the coordinate values in the first color space (for example, values regarding the brightness) as in the second illustrative embodiment.

Third Illustrative Embodiment

Differences between a third illustrative embodiment and the first illustrative embodiment will be described. The third illustrative embodiment uses a monochrome ICC profile 68 shown in FIG. 2D, instead of the monochrome ICC profile 66 of the first illustrative embodiment. The monochrome ICC profile 68 includes functions for converting RGB coordinate values into XYZ coordinate values. In the functions, γ gray, a1, a2, and a3 are predetermined constant values. If substituting any one value (for example, an R value) of RGB coordinate values into Gray in the functions, XYZ coordinate values are obtained. As described above, in each pixel constituting JPEG image data representing a monochrome image, the RGB coordinate values are the same value. Therefore, even when any value of the RGB coordinate values of each pixel constituting the JPEG image data is substituted into the Gray in the functions, the identical XYZ coordinate values are obtained. Further, the data size of the monochrome ICC profile 68 is smaller than the data sizes of other ICC profiles 62 and 64.

For example, the control unit 20 of the PC 10 acquires the monochrome ICC profile 68 from an external device (for example, a server provided by the vendor of the multifunction device 60), and stores in the memory 24 in advance. The preparing unit 34 reads the monochrome ICC profile 68 stored in the memory 24 in the process of step S18 of FIG. 3, thereby preparing the monochrome ICC profile 68 (that is, entire functions). The other processes are the same as those in the first illustrative embodiment. In the third illustrative embodiment, the monochrome ICC profile 68 is an example of the second color conversion profile. Further, the RGB coordinate values are examples of values corresponding to the coordinates in the first color space.

Similarly to the second illustrative embodiment, also in the third illustrative embodiment, if an edit of the monochrome conversion is performed, image data in which each pixel is represented by one value regarding the brightness may be generated. In this case, the monochrome ICC profile 68 may be functions for converting values regarding the brightness into XYZ coordinate values. In the example, the values regarding the brightness are examples of the values corresponding to the coordinate values in the first color space. That is, in general, the values corresponding to the coordinate values in the first color space may be coordinate values themselves in the first color space or may be values (for examples, values regarding the brightness) obtained from the coordinate values in the first color space.

First Modified Example

Each of the ICC profiles 62 to 68 of the first to third illustrative embodiments may be a profile for converting RGB image data into image data (that is, L*a*b* image data) in which a value of each pixel is represented by coordinate values in an L*a*b* color space. In general, the first color conversion profile may be a profile for converting original image data in which a value of each pixel is represented by coordinate values in the first color space (for example, the RGB color space in the first to third illustrative embodiments) into first intermediate image data in which a value of each pixel is represented by coordinate values in the second color space (which is the XYZ color space in the first to third illustrative embodiments and is the L*a*b* color space in a first modified example). Further, the second color space may be the same color space as the first color space or may be a color space different from the first color space. Furthermore, in general, the second color conversion profile may be a profile for converting edited image data in which a value of each pixel is represented by coordinate values in a third color space (the RGB color space in the first to third illustrative embodiments) into second intermediate image data in which a value of each pixel is represented by coordinate values in a fourth color space (which is the XYZ color space in the first to third illustrative embodiments, and the L*a*b* color space in the first modified example). The fourth color space may be the same color space as the third color space or may be a color space different from the third color space.

Second Modified Example

The third color space may be the same color space (for example, the RGB color space) as the first color space or may be a color space (for example, an sRGB color space) different from the first color space. If the third color space is different from the first color space, the editing unit 32 may edit original image data in which a value of each pixel is represented by coordinate values in the first color space (for example, the RGB color space), so as to generate edited image data in which a value of each pixel is represented by coordinate values in the third color space (for example, the sRGB color space) different from the first color space. The fourth color space may be the same color space (for example, the XYZ color space) as the second color space or may be a color space (for example, the L*a*b* color space) different from the second color space.

Third Modified Example

The first color space and the third color space may be color spaces (for example, the RGB color space) for representing device-dependent colors depending on characteristics of a device generating original image data (for example, the multifunction device 60), or may be standard color spaces (for example, the sRGB color space). Further, the second color space and the fourth color space may be color spaces (for example, the XYZ color space or the L*a*b* color space) for representing device-independent colors independent from the characteristics of the device.

Fourth Modified Example

In the first to third illustrative embodiments, the storage control unit 36 associates the edited JPEG data with the prepared ICC profile, and stores the edited JPEG data and the prepared ICC profile in the memory 24 of the PC 10. In a fourth modified example, the storage control unit 36 may associate the edited JPEG data with the prepared ICC profile, and store the edited JPEG data and the prepared ICC profile in another memory (for example, the memory of the multifunction device 60, the USB memory 8, or an external storage device such as a recording medium (such as a CD, a DVD, or the like) installed in the PC 10).

Fifth Modified Example

The monochrome ICC profile 68 in the third illustrative embodiment may include entire functions, or may include only constant values to be used in the functions without including entire functions. In general, the second color conversion profile may include at least constant values to be used in the functions for converting values corresponding to coordinate values in the first color space into coordinate values in the second color space.

Sixth Modified Example

Similarly to the monochrome ICC profile 68 in the third illustrative embodiment, each of the ICC profiles 62 to 66 may be a profile including the constant values to be used in functions for converting the coordinate values in the first color space into the coordinate values in the second color space.

Seventh Modified Example

In step S20 of FIG. 3, the preparing unit 34 determines whether the ratio of the second number of pixels to the first number of pixels is the second threshold value or more. However, the preparing unit 34 may determine whether the second number of pixels is the first threshold value or more. If the second number of pixels is the first threshold value or more, in the step S22, the determination result of the preparing unit 34 may be Yes, and if the second number of pixels is less than the first threshold value, in step S22, the determination result may be No.

Eighth Modified Example

The editing unit 32 may perform an edit other than the various kinds of edits described in the first to third illustrative embodiments. For example, the editing unit 32 may perform an edit for changing the number of colors (the number of bits of each pixel) of the JPEG image data included in the acquired JPEG data. For example, if the JPEG image data included in the acquired JPEG data is represented by a 512 tone level of RGB, the editing unit 32 may reduce the number of colors of the JPEG image data, so as to generate JPEG image data of a 256 tone level of RGB. If this edit is performed, since the data size of the edited JPEG data is smaller than the data size of the acquired JPEG data, in step S22 of FIG. 3, the determination result is No.

Ninth Modified Example

In the first to third illustrative embodiments, the acquiring unit 30 acquires the original image data having a JPEG format. However, the acquiring unit 30 may acquire original image data having a format (for example, a TIFF format or a BMP format) other than the JPEG format. Similarly, the editing unit 32 may generate edited image data having a format (for example, the TIFF format or the BMP format) other than the JPEG format.

Tenth Modified Example

The image processing apparatus is not limited to the PC 10 but may be various kinds of devices such as a server, a printer, a scanner, a multifunction device, and a portable terminal (such as a portable phone, a PDA, or the like).

Specific illustrative embodiments and modified examples have been described in detail above; however, these examples are merely illustrative, and do not restrict the scope of the claims. Any of various modifications and changes of the specific examples illustrated above are included in the scope of the claims.

Moreover, the technical elements described in the present specification and drawings exhibit technical utility either alone or in any of various combinations, and there is no limitation to the combinations described in the claims at the time of filing. Moreover, the art illustrated in the present specification and drawings attains a plurality of objects simultaneously, but there is technical utility in attaining one of these objects.

What is claimed is:

1. An image processing apparatus comprising:
an acquiring unit that acquires original image data and a first color conversion profile associated with the original image data;
an editing unit that edits the original image data by using the first color conversion profile so as to generate edited image data;
a preparing unit that prepares a second color conversion profile different from the first color conversion profile in a first case where the editing unit generates the edited image data having a data size smaller than that of the original image data, wherein a data size of the second color conversion profile is smaller than that of the first color conversion profile; and
a storage control unit that, in the first case, stores the edited image data and the second color conversion profile in a memory while being associated with each other.

2. The image processing apparatus according to claim 1,
wherein the first color conversion profile is a color conversion profile in which M sets of coordinate values in a first color space are associated with M sets of coordinate values in a second color space, the M being an integer which is two or more, and
wherein the second color conversion profile is a color conversion profile in which N sets of values corresponding to N sets of coordinate values in the first color space are associated with N sets of coordinate values in the second color space, the N being an integer smaller than the M.

3. The image processing apparatus according to claim 1,
wherein in the first case, the preparing unit generates the second color conversion profile by using the first color conversion profile so as to prepare the second color conversion profile.

4. The image processing apparatus according to claim 1,
wherein the first color conversion profile is a color conversion profile in which a plurality of sets of coordinate values in a first color space are associated with a plurality of sets of coordinate values in a second color space, and
wherein the second color conversion profile is a color conversion profile including a constant value used in a function for converting values corresponding to coordinate values in the first color space into coordinate values in the second color space.

5. The image processing apparatus according to claim 1,
wherein the first case includes a case where the editing unit edits the original image data representing a color image so as to generate the edited image data representing a monochrome image.

6. The image processing apparatus according to claim 1,
wherein the first case includes a case where the editing unit generates the edited image data such that a number of pixels of the edited image data is smaller than that of the original image data.

7. The image processing apparatus according to claim 1,
wherein the first case includes a case where the editing unit generates the edited image data such that a ratio of a data size of the edited image data to a data size of the original image data is smaller than a predetermined value.

8. An image processing apparatus comprising:
an acquiring unit that acquires original image data and a first color conversion profile associated with the original image data;
an editing unit that edits the original image data by using the first color conversion profile so as to generate edited image data;
a preparing unit that prepares a second color conversion profile different from the first color conversion profile in a second case where the editing unit edits the original image data representing a color image so as to generate the edited image data representing a monochrome image, wherein a data size of the second color conversion profile is smaller than that of the first color conversion profile; and
a storage control unit that, in the second case, stores the edited image data and the second color conversion profile in a memory while being associated with each other.

9. The image processing apparatus according to claim 8,
wherein the first color conversion profile is a color conversion profile in which M sets of coordinate values in a first color space are associated with M sets of coordinate values in a second color space, the M being an integer which is two or more, and
wherein the second color conversion profile is a color conversion profile in which N values corresponding to N sets of coordinate values in the first color space are associated with N sets of coordinate values in the second color space, the N being an integer smaller than the M.

10. A non-transitory computer-readable medium having a computer program stored thereon and readable by a computer installed in an image processing apparatus, the computer program, when executed by the computer, causing the computer to perform operations comprising:

acquiring original image data and a first color conversion profile associated with the original image data;

editing the original image data by using the first color conversion profile so as to generate edited image data;

preparing a second color conversion profile different from the first color conversion profile in a first case where the editing operation generates the edited image data having a data size smaller than that of the original image data, wherein a data size of the second color conversion profile is smaller than that of the first color conversion profile; and storing the edited image data and the second color conversion profile in a memory while being associated with each other, in the first case.

11. A non-transitory computer-readable medium having a computer program stored thereon and readable by a computer installed in an image processing apparatus, the computer program, when executed by the computer, causing the computer to perform operations comprising:

acquiring original image data and a first color conversion profile associated with the original image data;

editing the original image data by using the first color conversion profile so as to generate edited image data;

preparing a second color conversion profile different from the first color conversion profile in a second case where the editing operation edits the original image data representing a color image to generate the edited image data representing a monochrome image, wherein a data size of the second color conversion profile is smaller than that of the first color conversion profile; and storing the edited image data and the second color conversion profile in a memory while being associated with each other, in the second case.

* * * * *